(12) United States Patent
Holzer (10) Patent No.: US 10,615,945 B1
(45) Date of Patent: Apr. 7, 2020

(54) CHANNEL COMBINER SUPPORTING SIMULTANEOUS MULTI-CHANNEL OPERATION

(71) Applicant: L-3 COMMUNICATIONS CORP., New York, NY (US)

(72) Inventor: Kyle David Holzer, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 267 days.

(21) Appl. No.: 15/367,773

(22) Filed: Dec. 2, 2016

Related U.S. Application Data (60) Provisional application No. 62/263,644, filed on Dec. 5, 2015.

(51) Int. Cl.
*H04L 5/12* (2006.01)
*H04L 27/20* (2006.01)

(52) U.S. Cl.
CPC ............ *H04L 5/12* (2013.01); *H04L 27/2035* (2013.01)

(58) Field of Classification Search
CPC ........................................................ H04L 5/12
See application file for complete search history.

(56) References Cited

U.S. PATENT DOCUMENTS

| | | | | |
|---|---|---|---|---|
| 4,380,010 A * | 4/1983 | Krajewski | ................. | G01S 3/46 342/368 |
| 5,789,996 A * | 8/1998 | Borodulin | ................. | H01P 5/12 333/117 |
| 5,903,827 A * | 5/1999 | Kennan | .................... | H01P 5/222 333/120 |
| 2007/0152772 A1* | 7/2007 | Runyon | ..................... | H01P 5/04 333/117 |
| 2010/0019860 A1* | 1/2010 | Kim | .......................... | H01P 1/10 333/101 |
| 2010/0295630 A1* | 11/2010 | Itoh | ........................ | H01P 1/2005 333/126 |
| 2012/0188917 A1* | 7/2012 | Knox | .................... | H01Q 1/2225 370/277 |
| 2015/0263435 A1* | 9/2015 | Song | ..................... | H01Q 21/062 343/810 |

OTHER PUBLICATIONS

C. Metz, T. Baras, "3-way Loaw Loss Phase Combiner for Power Amplifier Sharing in 3-Sector Cellular Networks", IEEE MTT-S Digest, 2004.

(Continued)

*Primary Examiner* — Noel R Beharry
*Assistant Examiner* — Ruihua Zhang
(74) *Attorney, Agent, or Firm* — Workman Nydegger (57) ABSTRACT

Embodiments include different multi-port ring combiners which are configured to act as multi-output signal routers. One type of multi-port ring combiner includes input ports that are driven by pairs of outphasing signals. The multi-port ring combiner also includes multiple channels that are independently routed to a first output, to a second output, or to a third output, according to a phase relationship of the multi-port ring combiner. The multi-port ring combiner enables an outphasing signal combination which provides output port selection. The multi-port ring combiner may be a 4-port ring combiner, a 5-port ring combiner or a 6-port ring combiner.

14 Claims, 9 Drawing Sheets

(56) References Cited

OTHER PUBLICATIONS

T. Baras, C. Metz, "Nonlinear System Performance of Shared Amplifiers based on 3-Way Microstrip Phase Combiners", IEEE 2005, 0-7803-8846-1/05.

L.G. Maloratsky, S.Y. London, "Quarter-wavelength N-way Power Dividiers/Combiners: Historical Aspects and New Modifications", Microwave Journal, Sep. 1, 2003.

* cited by examiner

$$S = \frac{-i}{\sqrt{2}} \begin{pmatrix} 0 & 1 & 0 & -1 \\ 1 & 0 & 1 & 0 \\ 0 & 1 & 0 & 1 \\ -1 & 0 & 1 & 0 \end{pmatrix}$$

4-Port Ring Combiner

Figure 7

5-Port Ring Combiner

Figure 8

6-Port Ring Combiner

CHANNEL COMBINER SUPPORTING SIMULTANEOUS MULTI-CHANNEL OPERATION

CROSS-REFERENCE TO RELATED APPLICATIONS

This application claims priority to and the benefit of U.S. Provisional Patent Application No. 62/263,644, filed on Dec. 5, 2015, entitled "Channel Combiner Supporting 2 and 3 Channel Operation Simultaneously," which application is incorporated by reference herein in its entirety.

BACKGROUND

The number of mobile phones and other wireless devices in use continues to escalate. As each wireless device initiates and receives communications, available transmission spectrum becomes ever harder to access. Global internet protocol (IP) traffic is now measured in zettabytes, fueling higher data-rate connectivity demand for on-demand consumer access. Although some large consumer providers have had success obtaining larger spectrum allocation at considerable cost, more intelligent use of existing spectrum may go significantly further in advancing data-rates in the near term.

Carrier Aggregation (CA) increases instantaneous individual data throughput by aggregating the bandwidth of multiple available channels. Increased channel flexibility, as provided by CA, improves the probability of sufficient network bandwidth. Accordingly, increased channel availability enables higher probability of a successful network connection. The increase in the number of available channels decreases the probability of the data transmission being blocked, in some cases with more than a linear one-to-one relationship. This increased resource utilization and spectrum efficiency is commonly referred to as "trunking gain."

Figure 1:
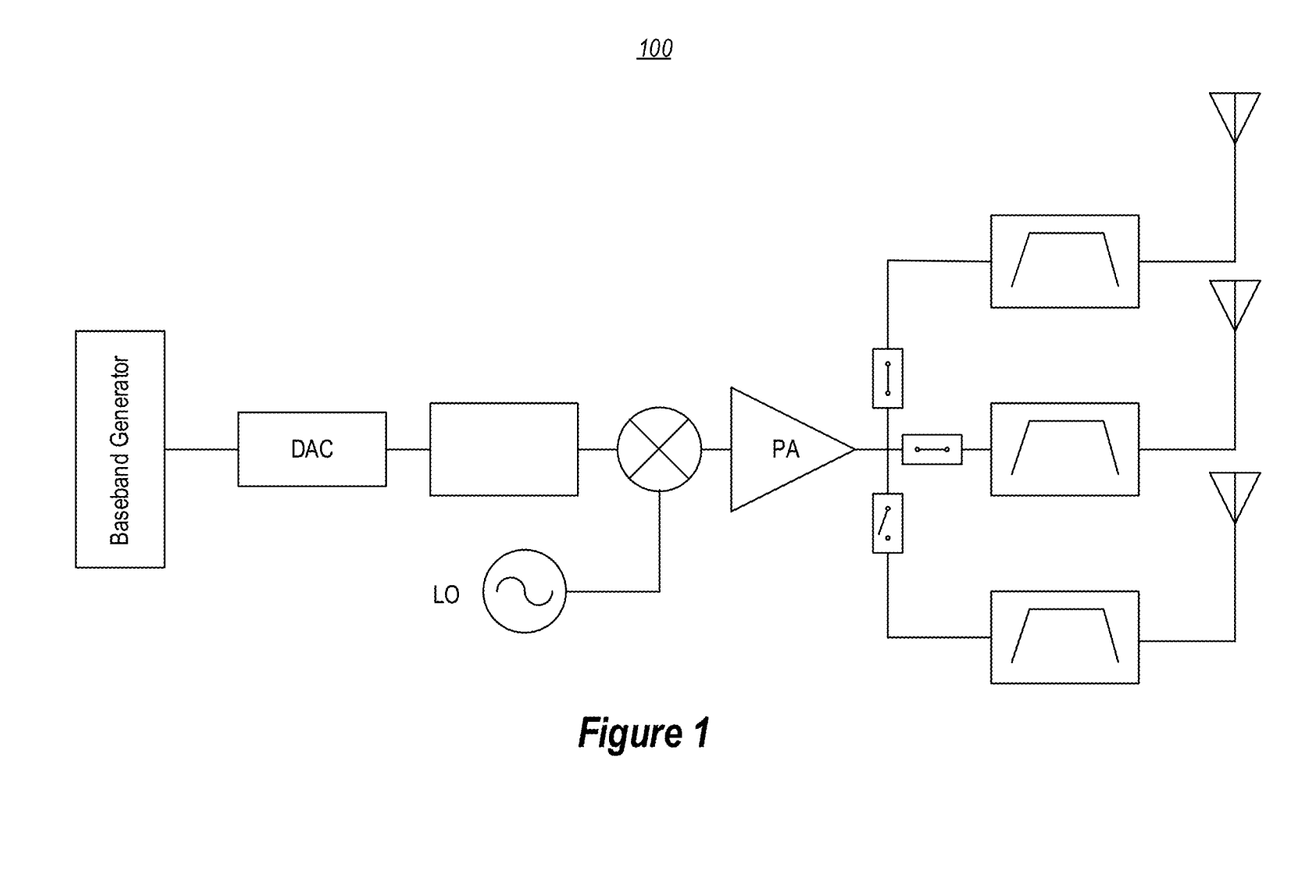
FIG. 1 (Prior Art) illustrates a traditional ring combiner.

Traditional Carrier Aggregation (CA) transmitter architecture approaches are shown in FIG. 1 (Prior Art). Traditional CA architecture 100 dedicates a transmitter chain for each carrier channel. This allows for channel specific amplifier and filter component optimizations. The state of the art approach is to optimize the power amplifier for operation over all target carrier channels. A switch matrix is used to multiplex the power amplifier output signal between the desired bandpass filters and antenna ports. Power amplifier performance is dependent upon the output match and multiplex configuration.

Thus, traditional implementations tend to duplicate the entire amplifier chain for each discrete band or channel. Other traditional implementations reuse amplifiers and further use transfer switches to select which transmission antenna is used. Such implementations waste energy on additional amplifier chains or waste transmit power in the transfer switch, and furthermore, outphasing artifacts are dumped to a matching resistor, which limits high power handling capabilities.

BRIEF DESCRIPTION

Embodiments described herein embed signal multiplexing as part of a power amplifier design in combination with a multi-channel aggregate ring combiner. In one embodiment, a multi-port ring combiner is described which is configured to act as a multi-output signal router. The multi-port ring combiner includes input ports that are driven by pairs of outphasing signals. The multi-port ring combiner also includes multiple channels that are independently routed to a first output, to a second output, or to a third output, according to a phase relationship of the multi-port ring combiner. The multi-port ring combiner enables an outphasing signal combination which provides output port selection. In some cases, this multi-port ring combiner is a 4-port ring combiner.

In another embodiment, a 5-port ring combiner is described. The 5-port ring combiner includes three input ports and two output ports. The 5-port ring combiner also includes six 90-degree electrical length sections connecting the three input ports to the two output ports and, with any two inputs directly adjacent to an output port, an in-phase outphasing signal combination routes signal energy to the directly adjacent output port, while the other output port is prevented from receiving signal energy.

In another embodiment, a 6-port ring combiner is described which is configured to act as a 3-output signal router. The 6-port ring combiner includes three or more input ports, any two of which form independent outphasing input pairs. The 6-port ring combiner also includes multiple channels that are independently routed to a first output, to a second output, or to a third output, according to a ring combiner phase relationship. The 6-port ring combiner further includes six 90-degree electrical length sections that connect the input and output ports. The 6-port ring combiner enables an outphasing signal combination which allows output port selection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein embed signal multiplexing as part of a power amplifier design in combination with a multi-channel aggregate ring combiner. In one embodiment, a multi-port ring combiner is described which is configured to act as a multi-output signal router. The multi-port ring combiner includes input ports that are driven by pairs of outphasing signals. The multi-port ring combiner also includes multiple channels that are independently routed to a first output, to a second output, or to a third output, according to a phase relationship of the multi-port ring combiner. The multi-port ring combiner enables an outphasing signal combination which provides output port selection. In some cases, this multi-port ring combiner is a 4-port ring combiner.

In another embodiment, a 5-port ring combiner is described. The 5-port ring combiner includes three input ports and two output ports. The 5-port ring combiner also includes six 90-degree electrical length sections connecting the three input ports to the two output ports and, with any two inputs directly adjacent to an output port, an in-phase outphasing signal combination routes signal energy to the directly adjacent output port, while the other output port is prevented from receiving signal energy.

In another embodiment, a 6-port ring combiner is described which is configured to act as a 3-output signal router. The 6-port ring combiner includes three or more input ports, any two of which form independent outphasing input pairs. The 6-port ring combiner also includes multiple channels that are independently routed to a first output, to a second output, or to a third output, according to a ring combiner phase relationship. The 6-port ring combiner further includes six 90-degree electrical length sections that connect the input and output ports. The 6-port ring combiner enables an outphasing signal combination which allows output port selection.

Figure 2:
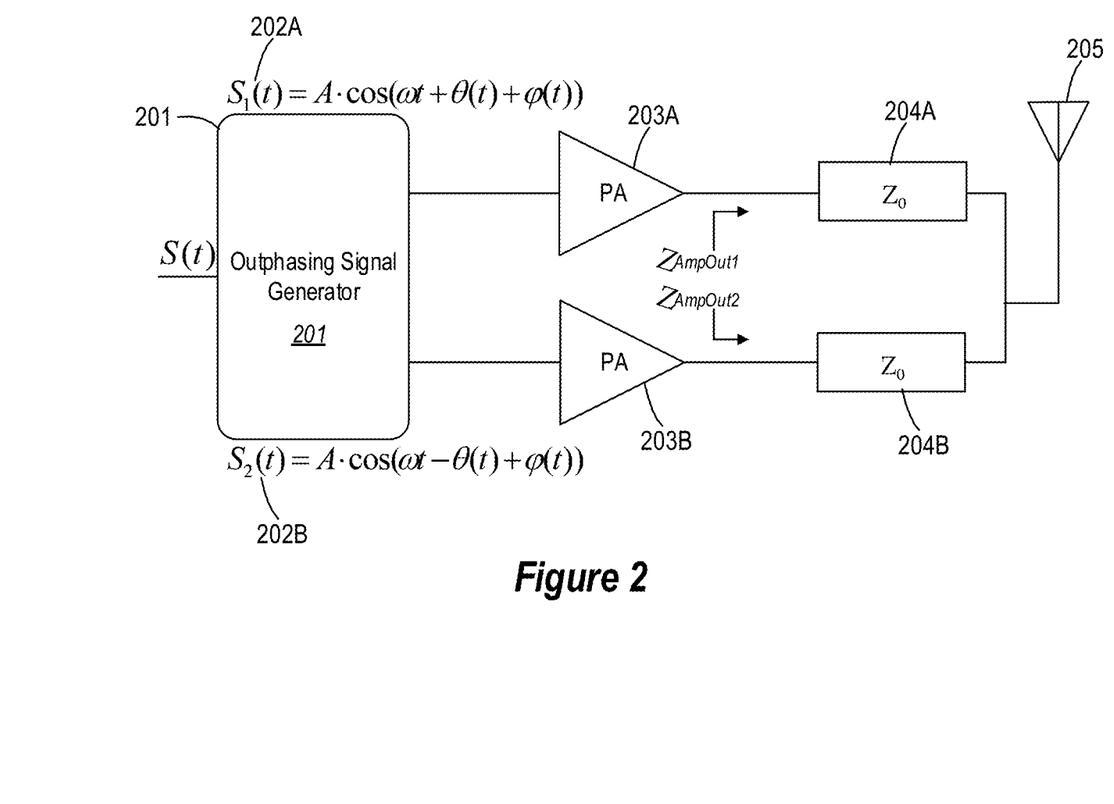
FIG. 2 illustrates an embodiment of an outphasing amplifier topology.

Outphasing, and techniques related thereto, is generally shown in circuit of FIG. 2. As the term is used herein, "outphasing" describes a method for efficiently amplifying non-constant envelope modulations. An outphasing signal generator 201 is illustrated in FIG. 2, which provides signals S1 (202A) and S2 (202B) to various power amplifiers 203A and 203B, respectively. The signals are then passed to resistors 204A and 204B, and then on to an output such as an antenna or other output path.

As such, the circuit of FIG. 2 generally describes the topology of at least one embodiment of an outphasing amplifier. The outphasing angle $\Theta(t)$ corresponds to the time-varying envelope component of the modulated signal. $\Theta(t)$ is added to the phase modulation in one path (e.g. through power amplifier 203A and resistor 204A), and subtracted in the other path (e.g. through power amplifier 203B and resistor 204B). At the amplifier output, the outphasing waveforms are combined constructively or destructively, depending on the value of $\Theta(t)$, restoring the time-varying envelope and a linear output amplitude response even as the power amplifiers are running in the most efficient non-linear region.

As described herein, three categories of outphasing combiners may be used: branchline, ring hybrid and transformer-based. Branchline combining enlists a distributed quarter wavelength transition section on each leg. Amplifier efficiency decreases with back-off from peak recombined output power, as the destructive vector difference is dissipated into the matching resistor. In at least some embodiments, power levels are above one Watt and, as such, the thermal limit of the matching resistor may be quickly exceeded.

Ring hybrid coupler efficiency and linearity are similar to the branchline combiner except that difference energy is directed to a discrete port of the combiner. This energy can be harvested or directed to an off-chip load where high thermal loading is easier to handle. Transformer-based solutions for the combiner are met with similar efficiency limitations in backoff, in addition to lumped element Ohmic losses. With high-Q elements, the transformer-based approach can be made to work for specific frequency points, but may be difficult to implement across a broad spectrum of frequencies.

Embodiments described herein may be designed to implement an outphasing pair and ring combiner to allow for improved thermal dissipation, efficient and linear high power combining and flexible aggregate channel coverage. Efficiency at backoff can be significantly improved using Envelope Elimination and Restoration techniques (EER) for all CA combinations, as will be explained further below, especially in relation to FIG. 6.

Figure 3:
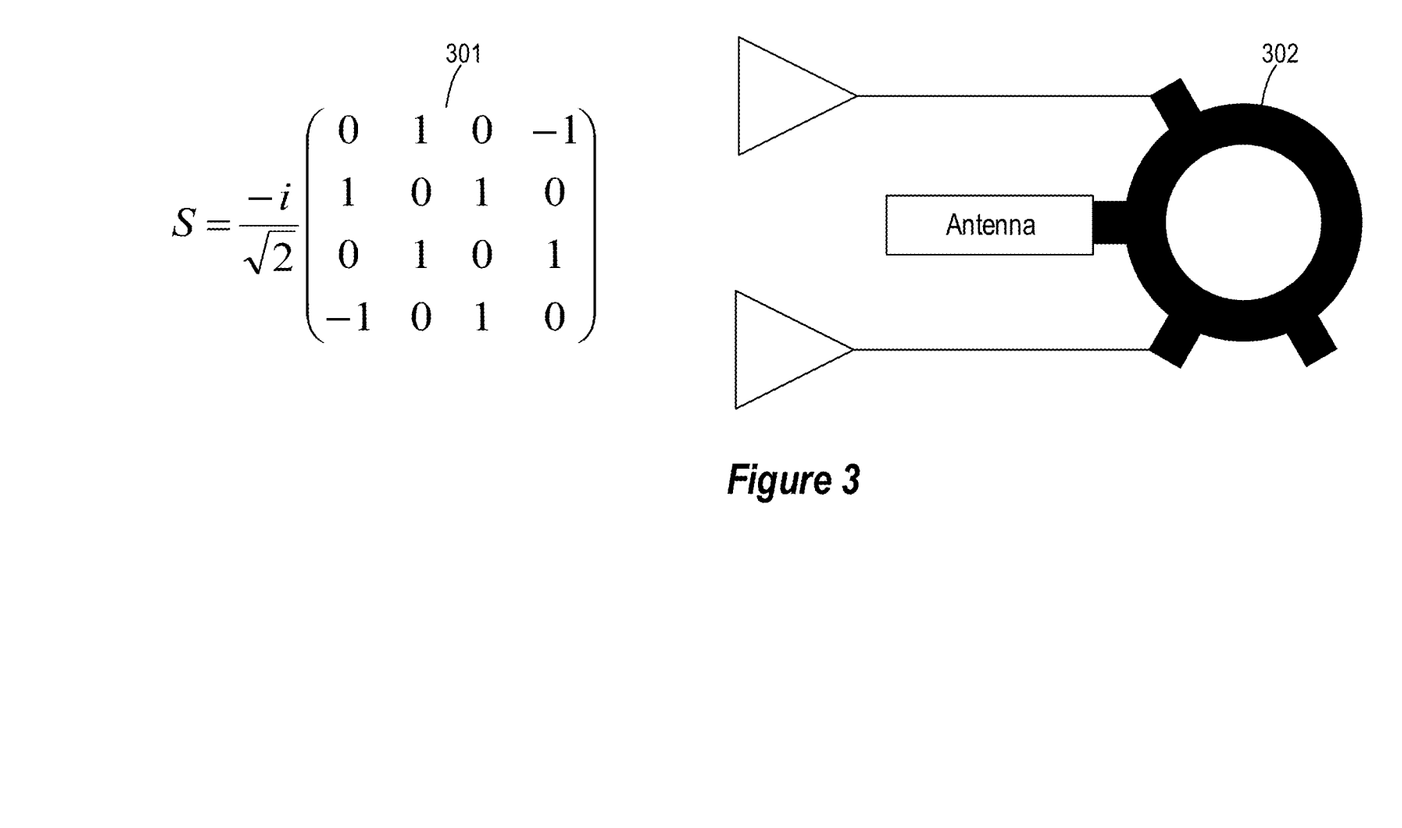
FIG. 3 illustrates an embodiment of a 2-channel, 4-port ring combiner.
Figure 4:
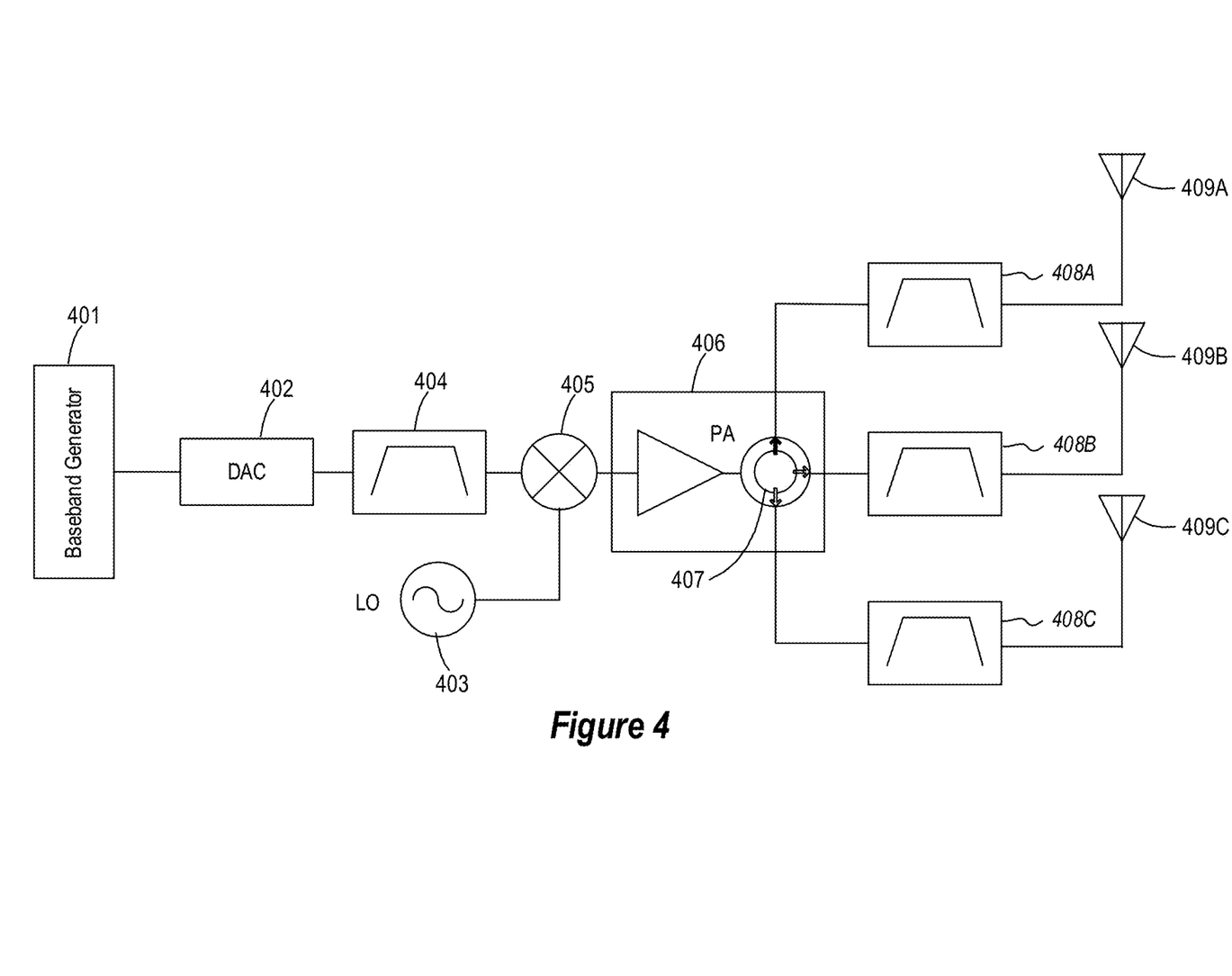
FIG. 4 illustrates an embodiment of a schematic view of a 3-channel aggregate ring combiner.

FIG. 3 illustrates a 4-port S-parameter matrix 301 for a 180° Ring Hybrid Coupler 302 (sometimes referred to as a "Rat Race" coupler). The electrical wavelength rotation around the ring ensures that in-phase waveform components combine constructively at the Sum output port, and remaining vector components combine at the Delta output port. The Sum and Delta port relationship can be used to route aggregate channels simultaneously to the desired output port (e.g. an antenna port). Thus, as shown in FIG. 4, a baseband generator 401 can generate a signal which is fed to a digital to analog converter (DAC 402), and then potentially to a filter 404 and/or other signal processing element such as a mixer 405 (which takes as input a signal from a local oscillator 403). The signal is then directed to a power amplifier 406 along with a combiner 407 that facilitates the flow of the signal to one of three output paths (e.g. through a filter and to an antenna). Thus, such output paths may include filter 408A and antenna 409A, 408B and antenna 409B, or filter 408C and antenna 409C.

Figure 5:
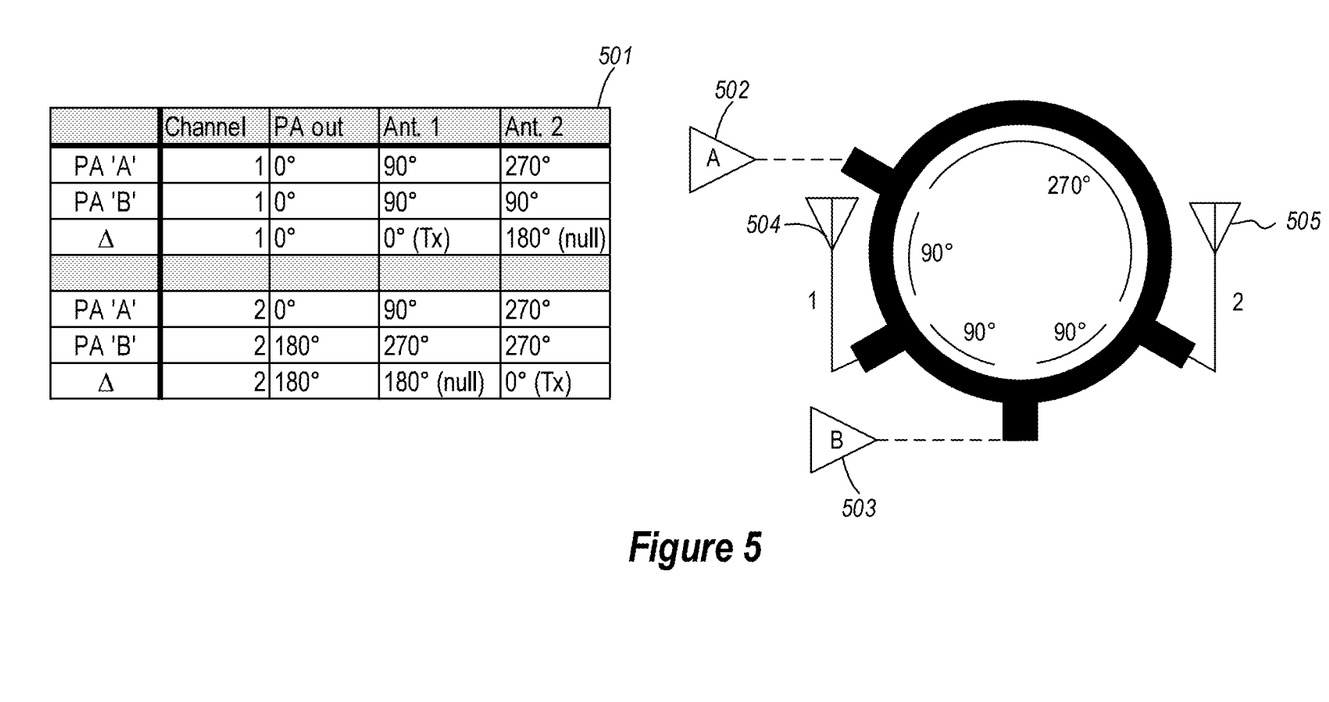
FIG. 5 illustrates an embodiment of a 2-channel, 4-port ring combiner that includes an indication of antennae and phase relationships.

FIG. 5 illustrates a chart 501 with frequency components for two channels, 1 and 2 (i.e. 504 and 505 of FIG. 5, respectively). Channel 1 frequency components are relatively in phase at amplifier input ports A and B (i.e. 502 and 503 in FIG. 5) while channel 2 frequency components are 180° out of phase. For discrete channel multiplexing, outphasing is used for both output port selection and recreating amplitude modulation. For constant amplitude waveforms, multiple channels can be simultaneously routed to both output ports (e.g. antenna ports 504 and 505), as outphasing is primarily used for channel routing. For multiple channels with amplitude modulated (AM) content, the waveform is reconstructed at the antenna port with a combination of max hold EER and variable attenuation elements in the filter/antenna path, as shown in FIG. 6.

Figure 6:
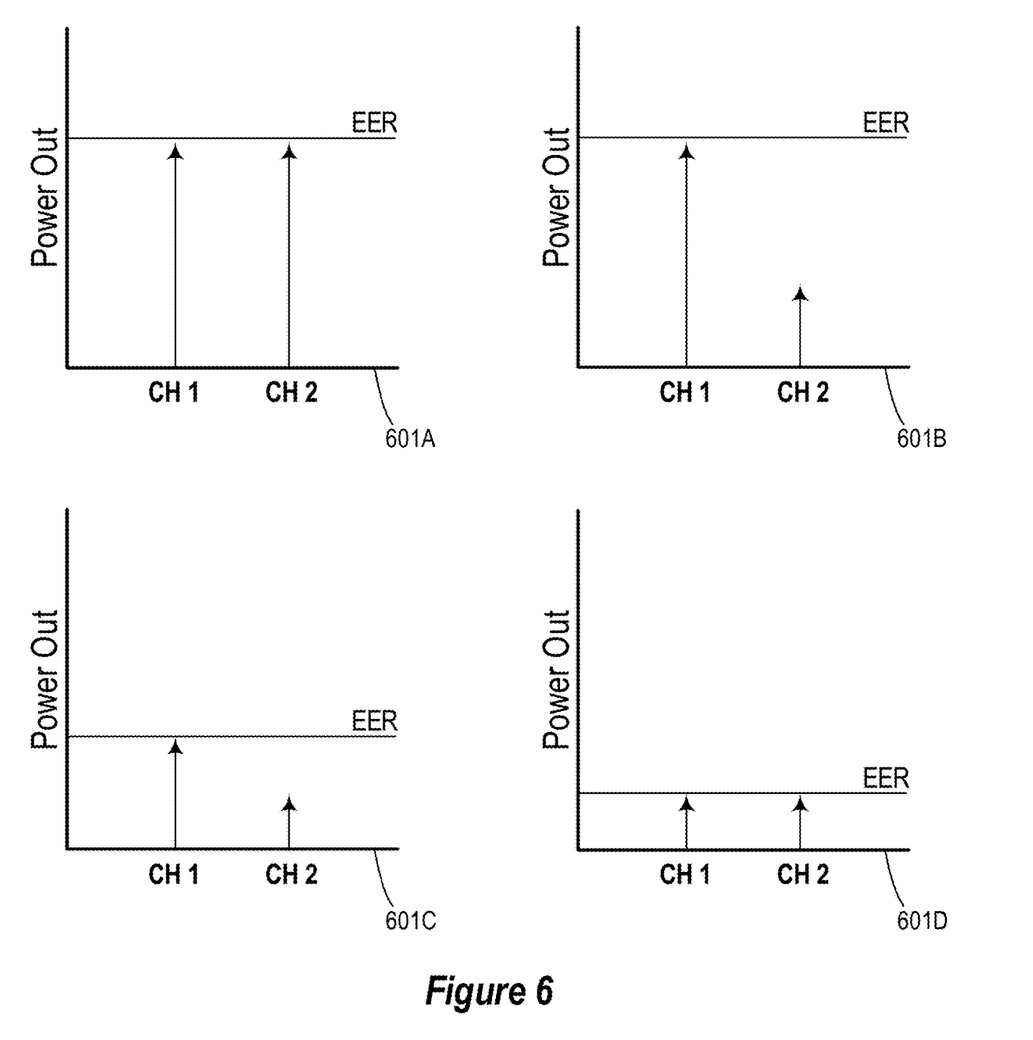
FIG. 6 illustrates example power outputs for different implementations of Envelope Elimination and Restoration (EER).

The 2-channel, 4-port CA ring hybrid combiner of FIG. 6 can result in channels 1 and 2 having an equal power output (601A), channel 1 having a substantially higher power output than channel 2 (601B), channel 1 having a slightly higher power output than channel 2 (601C), or channel 1 and channel 2 both having an equal, lower power output (601D). The Envelope Elimination and Restoration (EER) techniques may be applied to the output signals to increase output efficiency. Each CA combination of the 2-channel, 4-port ring hybrid combiner of FIG. 6 can thus result in different power output of the two channels, controlled using outphasing signal combination.

As used herein, the term 'channel' can represent a single carrier waveform (i.e., 64 quadrature amplitude modulation (QAM), minimum-shift keying (MSK), etc.) or an aggregation of waveforms. Limitations on the number and type of aggregate waveforms may include frequency spectrum, linearity of radio and bandwidth of CA ring combiner implementation.

In another embodiment, a 3-channel, 6-port aggregate ring combiner is provided. A 6-port ring hybrid may use similar methodology in combining three unique outphasing pairs to produce individual waveform sets at three unique output ports with similar operation compared to the 2-channel CA ring combiner of FIG. 5. Each port is separated by a 90° electrical length section. Three amplifier input ports are used and three output (e.g. filter/antenna) ports are used. Each antenna port may be driven by its adjacent amplifier pair that correspondingly provides 180° out of phase signals to the other two antennas. Various combinations including 4-port, 5-port and 6-port CA ring combiners that will now be discussed with reference to FIGS. 7-9.

In one embodiment, a multi-port ring combiner is described which is configured to act as a multi-output signal router. In some cases, the multi-port ring combiner may be a 4-port ring combiner, such as ring combiner 700 of FIG. 7. The multi-port ring combiner 700 includes two input ports (701 and 702) that are driven by pairs of outphasing signals. The multi-port ring combiner also includes multiple channels that are independently routed to a first output (703), to a second output (704), or to a third or subsequent output if the multi-port ring combiner includes additional ports.

The channels are routed according to a phase relationship of the multi-port ring combiner. Indeed, the multi-port ring combiner enables an outphasing signal combination which provides output port selection. As shown above in chart 1 of FIG. 5, the phase of channel 1 at antenna 1 (504) from source A (502) is 90 degrees, and is 270 degrees at antenna 2 (505). The phase of channel 1 at antenna 1 from source B (503) is 90 degrees, and is 90 degrees at antenna 2. The delta between the signals at antenna 1 is zero degrees, meaning that channel 1 is transmitted over antenna 1 (indicated by the Tx in chart 501), and the delta between the signals at antenna 2 is 180 degrees, indicating that no signal is transmitted over antenna 2 (indicated by the null in chart 501). In the second case, the power amplifiers A and B output signals at zero degrees and 180 degrees, resulting in a delta of 180 degrees at antenna 1 (no transmission) and zero degrees at antenna 2, resulting in a transmission of channel 2 from antenna 2.

These same outphasing principles can be applied to 4-port, 5-port, 6-port or other types of multi-port ring combiners to control which output the signal is sent to. In cases where the multi-port ring combiner includes four ports, six 90-degree electrical length sections 705 may be used (as in combiner 700 of FIG. 7) to separately connect the ports. Alternatively, as shown in the 4-port combiner of FIG. 5, three 90-degree sections and one 270-degree electrical length section may be used to separately connect the ports of the combiner. Other lengths or combinations of electrical sections may also be used.

Figures 7, 8, 9:
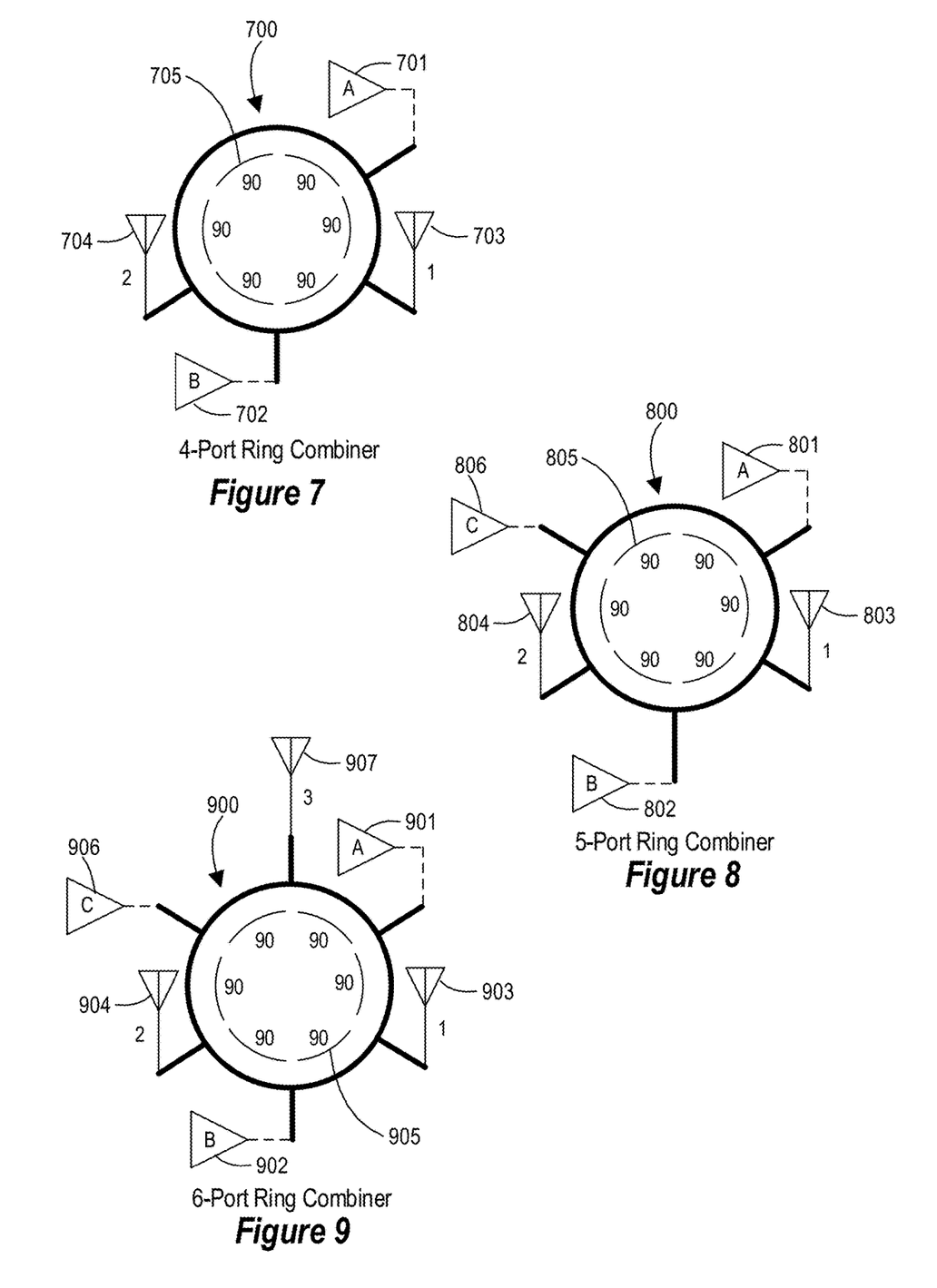
FIG. 7 illustrates an embodiment of a 4-port ring combiner.
FIG. 8 illustrates an embodiment of a 5-port ring combiner.
FIG. 9 illustrates an embodiment of a 6-port ring combiner

In the case of the 4-port combiner 700 of FIG. 7, two input ports (701 and 702) are separated by two 90-degree electrical length sections. One output port (703) is directly between the input ports, with one 90-degree electrical length section between each input port. The other output port 704 is located one 90-degree electrical length section from input port 702, and three 90-degree electrical length sections from input port 701. It will be understood that many such combinations are possible and are contemplated herein.

Regardless of the configuration, the various channels of the 4-port multi-port ring combiner 700 are independently routed to both the first output 703 and the second output 704, according to the phase relationship of the multi-port ring combiner. The outputs 703 and 704 may be antenna, filters or other types of electrical components or devices configured to receive a signal. In cases where the outputs 703 and 704 are antennae, the signals received at those outputs are transmitted via the antenna to other listening devices, assuming the outphasing relationship results in a transmittable signal.

Enabling outphasing signal combination allows output ports to be selected for certain purposes. For example, different antennae have different characteristics. Some antennae have specified directional gain characteristics. These antennae may be selected using outphasing signal combination. In one example, the antenna or other output may be selected on a per-channel basis. Thus, one channel may be intended for a certain type of antenna, and may be routed to that antenna using outphasing signal combination in conjunction with a multi-port ring combiner.

In other cases, signals may be intended for other outputs, depending on which electronic components are connected to the output ports. For example, an antenna may be selected on the basis of frequency characteristics, or a port may be selected because it is connected to a specific type of filter. These outputs may be selected on an ongoing basis, and may be dynamically changed as needed. Thus, for instance, an outphasing signal generator (e.g. 201) may receive an indication that it is to cause a change in output port. The outphasing signal generator may then change the phase of the input signals provided to the multi-port ring combiner to change which port a given channel is routed to. When the channel is routed to the outputs, a certain amount of signal isolation is provided by the ring combiner. This signal isolation provides for a cleaner transmission with less noise or interference. In some cases, a minimum of 20 dB signal isolation exists between the first output 703 and the second output 704.

Turning now to FIG. 8, a 5-port ring combiner 800 is described. The 5-port ring combiner 800 includes three input ports (801, 802 and 806) and two output ports (803 and 804). The 5-port ring combiner 800 also includes multiple electrical length sections 805 connecting the three input ports to the two output ports. In some cases, as illustrated in FIG. 8, the 5-port ring combiner 800 includes six different electrical length sections 805 that may be used to connect the input ports to the output ports. With any two inputs directly adjacent to an output port, an in-phase outphasing signal combination may be used to route signal energy to the directly adjacent output port. Because an out-of-phase outphasing signal is provided at the adjacent output ports, those output ports are prevented from receiving signal energy and, as such, no signal is transmitted out of those ports.

In the 5-port ring combiner 800 of FIG. 8, the two output ports 803 and 804 are directly between the three input ports 801, 802 and 806, with one 90-degree electrical length section between each input and output port. Between input ports 801 and 806, however, two different 90-degree electrical length sections are used. Again, as can be seen in other embodiments (e.g. the 4-port ring combiner of FIG. 5), different length electrical sections may be used, including 180 degree and 270 degree lengths.

The two output ports 803 and 804 may be antenna outputs, as shown in FIG. 8, or may other types of outputs. During operation, at least one of the output ports is prevented from receiving signal energy due to receiving 180-degree out-of-phase cancelled waveforms, while the other output port receives signal energy due to receiving in-phase waveforms. The electrical connections between ports 805 may include six 90-degree electrical length sections connecting the three input ports to the two output ports.

Continuing with FIG. 9, a 6-port ring combiner 900 is described which acts as a 3-output signal router. The 6-port ring combiner 900 includes three or more input ports (e.g. 901, 902 and 906), any two of which form independent outphasing input pairs. The 6-port ring combiner 900 also includes multiple channels that are independently routed to a first output 903, to a second output 904, or to a third output 907, according to a ring combiner phase relationship. The 6-port ring combiner 900 also includes six 90-degree electrical length sections 905 that connect the input and output ports. The 6-port ring combiner enables an outphasing signal combination which allows output port selection.

The various channels are independently routed to a combination of the first output 903, the second output 904 and the third output 907, according to the ring combiner phase relationship. A chart similar to chart 501 of FIG. 5 could be created for the 6-port ring combiner 900 of FIG. 9. Suffice it here to say that a given signal could be sent to any single output port, or to any combination of output ports, depending on how the outphasing signal generator generating the input signals is programmed to function. For example, if output port 904 was chosen to output a given signal, the outphasing signal generator may output signals that result in 180-degree out-of-phase cancelled waveforms at each of output ports 903 and 907, while generating an in-phase signal at output port 904. If output port 907 was subsequently selected to output a given signal, either in addition to or as an alternative to the output at port 904, the outphasing signal generator may generate waveforms that, when combined at port 907 are in-phase, while other, unused output ports receive waveforms that, when combined, result in an out-of-phase cancelled signal.

Providing such embodiments which enable outphasing signal combination allows selection of antennas or other devices that have certain desired characteristics. In some embodiments, for example, the 6-port ring combiner 900 of FIG. 9 may implement outphasing signal combination to select an antenna or other output device that has specific directional gain characteristics. Use of such an antenna may allow the signal to be broadcast (more heavily) in a selected direction, according to the properties of the antenna. Similarly, outphasing signal combination may be used to select antennas having specific frequency characteristics, such as antennas designed to transmit and receive particularly high frequency or low frequency signals.

In some embodiments, the 6-port ring combiner 900 may be configured to receive and multiplex a signal according to a specified multiplexing scheme. The multiplexing scheme may be predefined according to desired parameters, and may be changed on the fly if desired. Once the signal has been multiplexed, the 6-port ring combiner is configured to output the multiplexed signal to at least one antenna or other output device. The outphasing combination may be enabled substantially without loss of power. Moreover, the signal can be routed to non-antenna output ports or ports for energy harvesting or off-chip thermal loads. This energy may then be used for other purposes.

It should be noted that any of the 4-port, 5-port, or 6-port ring combiners described herein can be configured with any geometric configuration. Thus, while the multi-port ring combiners are generally illustrated in FIGS. 5 and 7-9 as being circular, the ring combiners may be configured in substantially any shape or size, and are not limited to a circular configuration. For instance, the multi-port ring combiners may include any combination of geometric configurations including straight portions, corners, curves of various radius, including both convex and or concave curves, and any other geometric configuration that would allow outphasing signal combination in a combiner.

The multi-port ring combiner may be constructed of any type of electromagnetic wave propagation medium. For example, the ring combiner may contain any combination of electromagnetic wave propagation medium including Microstrip, Stripline, coaxial structure, waveguide, or any other electromagnetic wave propagation medium. The materials and design may be formed such that a minimum of 20 dB signal isolation exists between the ports. For instance, with regard to the 6-port ring combiner of FIG. 9, a minimum of 20 dB of signal isolation may exist between any two of the first output 903, the second output 904 and the third output 907.

Figure 10:
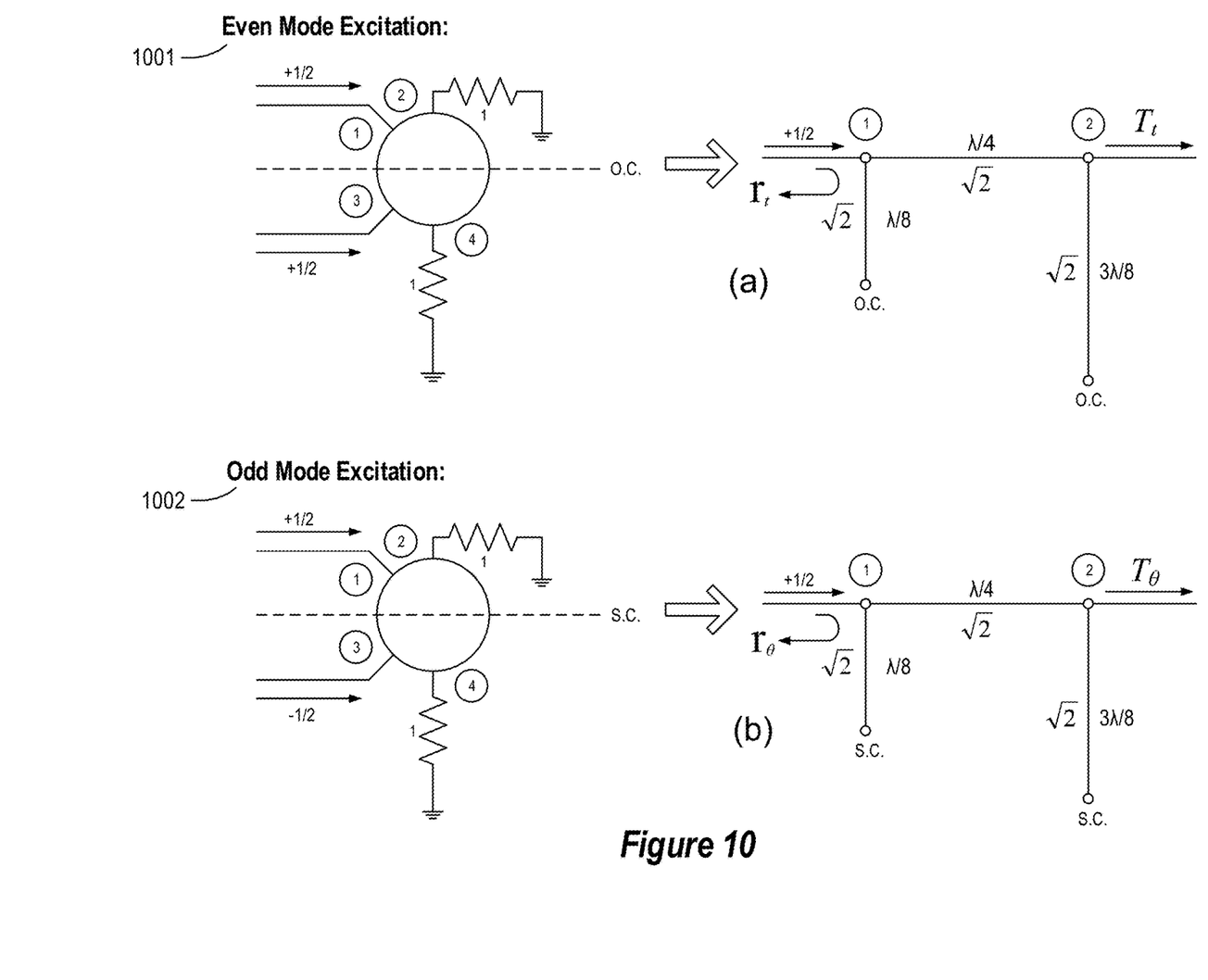
FIG. 10 illustrates embodiments of even mode and odd mode excitation for the 4-port ring combiner.

Turning now to FIG. 10, even mode and odd mode operation are discussed. In some cases, the inputs (e.g. the power amplifiers) are optimized so that the non-participating amplifier reduces in-channel ring loading. If such optimization is not performed, output efficiency may be degraded. Derivations of even and odd mode operation are generally illustrated in elements 1001 and 1002 of FIG. 10. Traditional ring combiners are inherently narrowband with less than 10% bandwidth due to frequency selective 90-degree sections. Embodiments that replace the 270° section with a 90-degree inverse coupler have been shown to extend bandwidth to 20%. Use of phase-stable matching sections at the ring ports can be implemented to further improve bandwidth to better than 50%.

A 2-channel design described herein may be optimized for <0.2 dB flatness across 5-6 GHz using a hybrid ring coupler without matching sections. A 3-channel aggregate ring combiner may use 90-degree sections sized for 5.7 GHz in a traditional ring configuration. It will be understood, of course, that other frequencies may be used, and that 5.7 GHz has been chosen arbitrarily for one embodiment described herein.

Figure 11:
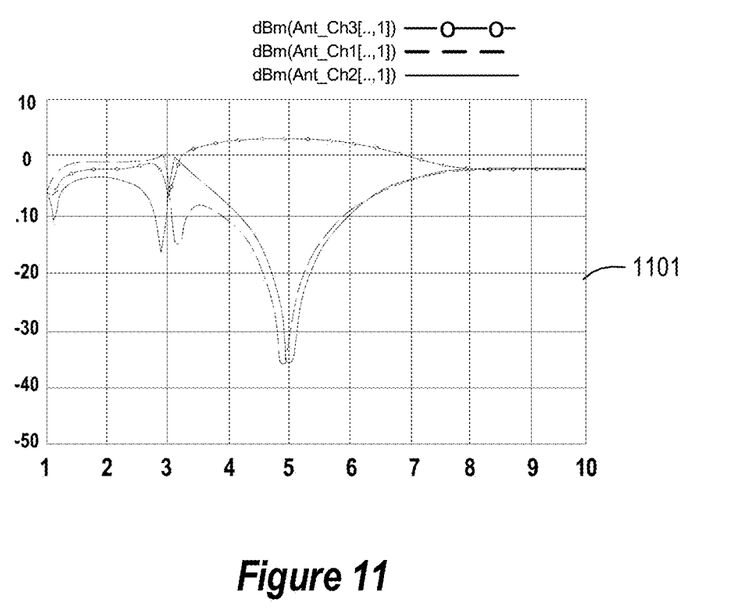
FIG. 11 illustrates example measured performance of a 3-channel combiner with an unused driver loading ring, and filtered with a high-Q LC tank rejection filter.

FIG. 11 shows the combined output power and adjacent channel rejection for a 2-channel aggregate ring combiner (e.g. a 4-port or 5-port ring combiner). Measurement data shows better than 30 dB of adjacent channel rejection (at point 5 in chart 1101). This rejection is comparable to a high-power, pin-diode transfer switch with less transmit path insertion loss and potentially smaller implementation size.

Figure 12:
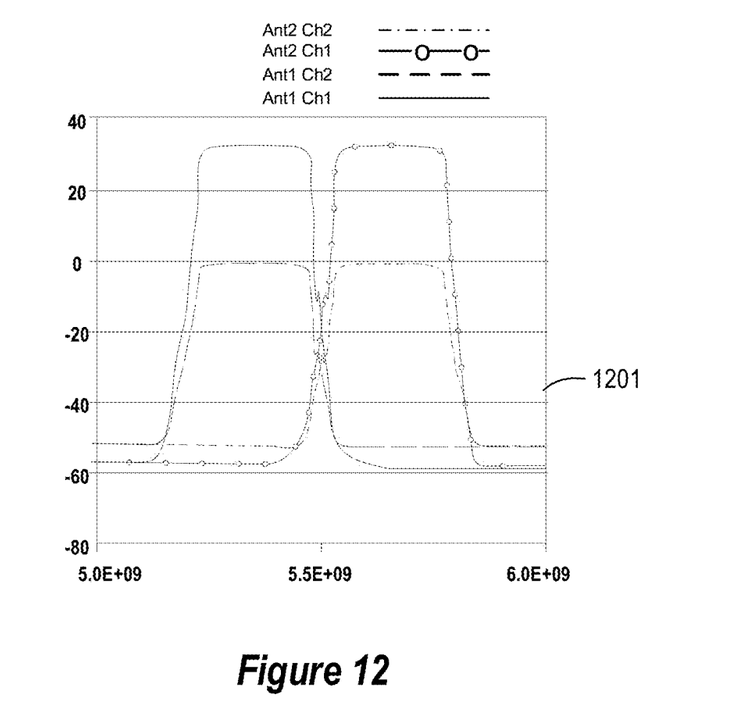
FIG. 12 illustrates an example spectrum of two simultaneous aggregate channels in operation.

Chart 1201 of FIG. 12 shows the measured performance of a 3-channel combiner (e.g. a 6-port ring combiner) with an unused driver loading ring, and filtered with a high-Q LC tank rejection filter. FIG. 12 generally shows an example spectrum of two simultaneous aggregate channels in operation. Adjacent channel rejection of greater than 30 dB is shown with a power-added efficiency (PAE) of 35% and 31 dBc adjacent channel power ratio (ACPR).

Thus, as can be seen from the foregoing, FIGS. 2-11 generally describe approaches for enabling software-controlled channel outphasing signal combination (i.e. multiplexing) as part of a power amplifier design. Designs of both 2- and 3-channel aggregate ring combiners are shown that provide greater than 20 dB of multiplexing isolation without the use of a traditional switching matrix. Configurations described herein are shown for a ring hybrid combiner supporting 2-channel operation simultaneously. Selective phase combination for outphasing amplifier legs keeps both channels orthogonal, providing significant channel-to-channel isolation. This reduces RFE size, weight and power, and increases power amplifier efficiency.

In this manner, an outphasing combination may be used for signal routing, and may be used to accurately recreate AM content at antenna. This provides linear operation (as single channel outphasing), eliminates lossy switches between power amplifiers and antennae, and eases channel isolation requirements on filters, in some cases providing >30 dB routing isolation.

Still further, as mentioned above, the embodiments described herein include a new approach for enabling software-controlled channel multiplexing as part of a power amplifier design. The software-controlled channel multiplexing may be controlled according to a method. The method may include computer-implemented steps including receiving a signal, multiplexing the received signal according to a specified multiplexing scheme, and then outputting the multiplexed signal to a ring combiner. The software may be run on a generic computing system, or may be run on a special purpose computing system such as a microcontroller or programmable logic device (PLD). Indeed, the software may be stored and/or executed on a variety of different computing devices, including those outlined and explained below.

The embodiments described herein, especially those that implement software in some form, may implement various types of computing systems. These computing systems can take a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A system for routing signals, the system comprising:
   a 5-port ring combiner, comprising:
      three input ports;
      two output ports; and
      a plurality of electrical length sections connecting the three input ports to the two output ports;
   a plurality of outphasing signal generators, with a different signal generator coupled to each of the three input ports of the 5-port ring combiner;
   wherein, with any two inputs directly adjacent to an output port, an in-phase outphasing signal combination from the outphasing signal generators routes signal energy to the directly adjacent output port, while the other output port is prevented from receiving signal energy.

2. The system for routing signals of claim 1, wherein the 5-port ring combiner includes three input ports with two electrical length sections between each input port.

3. The system for routing signals of claim 1, further comprising antenna outputs coupled to the two output ports.

4. The system for routing signals of claim 1, wherein at least one output port is prevented from receiving signal energy due to receiving 180-degree out-of-phase cancelled waveforms.

5. The system for routing signals of claim 1, wherein the six electrical length sections connecting the three input ports to the two output ports comprise 90-degree electrical length sections.

6. The system for routing signals of claim 1, further comprising filter outputs coupled to the two output ports.

7. A 6-port ring combiner configured to act as a 3-output signal router, comprising:
   three or more input ports, any two of which form independent outphasing input pairs;
   a plurality of channels that are independently routed to a first output or to a second output or to a third output, according to a ring combiner phase relationship; and
   six 90-degree electrical length sections that connect the input and output ports,
   wherein the 6-port ring combiner enables an outphasing signal combination which allows output port selection.

8. The 6-port ring combiner of claim 7, wherein three input ports are spaced apart by two 90-degree electrical length sections, and wherein three output ports are spaced apart by two 90-degree electrical length sections.

9. The 6-port ring combiner of claim 7, wherein the plurality of channels are independently routed to a combination of the first output, the second output and the third output, according to the ring combiner phase relationship.

10. The 6-port ring combiner of claim 7, wherein a minimum of 20 dB signal isolation exists between at least two of the first output, the second output and the third output.

11. The 6-port ring combiner of claim 7, wherein enabling the outphasing signal combination allows selection of antennas having specific directional gain characteristics.

12. The 6-port ring combiner of claim 7, wherein enabling the outphasing signal combination allows selection of antennas having specific frequency characteristics.

13. The 6-port ring combiner of claim 7, wherein the 6-port ring combiner is configured to receive and multiplex a signal according to a specified multiplexing scheme.

14. The 6-port ring combiner of claim 13, wherein the 6-port ring combiner is further configured to output the received, multiplexed signal to at least one antenna.

* * * * *